UNITED STATES PATENT OFFICE.

ERNST FISCHER AND PETER BERGELL, OF BERLIN, GERMANY.

PROCESS OF MAKING A NEUTRAL SODIUM SALT OF LACTALBUMIN.

962,753. Specification of Letters Patent. Patented June 28, 1910.

No Drawing. Application filed April 25, 1903. Serial No. 429,129. (Specimens.)

*To all whom it may concern:*

Be it known that we, ERNST FISCHER, a subject of the German Emperor, and residing at 231 Friedrichstrasse, and PETER BERGELL, a subject of the German Emperor, and residing at 30 Barbarossastrasse, Berlin, Germany, have invented certain new and useful Improvements in Processes of Making a Neutral Sodium Salt of Lactalbumin, of which the following is a specification.

This invention has reference to improvements in a process for producing a pure and neutral sodium salt of lactalbumin.

It is known that lactalbumin may be obtained from skim-milk on a large scale by adding an acid, removing the casein thereby precipitated and heating the solution now free from casein to 80° C. or somewhat higher, whereby the lactalbumin is precipitated. The lactalbumin thus obtained forms a coagulated mass which is insoluble in water and must be dried and freed from fat before the treatment can be continued. For dissolving such lactalbumin, when in a dry condition an excess of alkali is necessary. In general, 60 gr. of hydroxid of sodium (NaOH) will suffice for dissolving 1 kg. of dry lactalbumin which has been freed from fat. This solution is not neutral, but strongly alkaline and special precautions must be taken for removing the excess of alkali. The applicants then discovered that the lactalbumin precipitated from the alkaline solution by carefully adding an acid after having been washed with water, could be easily dissolved, while still in a moist condition, by means of a solution of sodium hydroxid containing a considerably smaller percentage of same. 1 kg. of lactalbumin is then easily dissolved by a diluted solution of sodium hydroxid containing but 26 gr. of same. This is easily and quickly effected and the solution thereby obtained is completely clear. It was further observed that just this quantity of alkali produces a neutral solution. Therefore it is rendered possible to obtain a pure and neutral sodium-lactalbumin by evaporating the neutral aqueous solution *in vacuo* whereby no decomposition takes place. The pure and neutral sodium-lactalbumin thus obtained exists in the form of a white dry powder.

Applicants found by experiments that lactalbumin freshly precipitated from an alkaline solution by means of an acid possesses the above mentioned properties which are different from those of the aforementioned ordinary commercial lactalbumin. The importance of recovering this substance in order to use it for feeding human beings, may be gathered from the fact that in mother's milk lactalbumin is contained in a much larger quantity than in cow's milk.

In order to make the invention clear the following example is herewith given. 10 kg. of dry and powdered lactalbumin freed from fat are mixed with water in the proportion of 1 to 20 and dissolved by slowly adding a solution of hydroxid of sodium containing 600 gr. of same. The solution thus obtained is neutralized by hydrochloric acid. After this 130 gr. of a 20% solution of hydrochloric acid of 1.08 specific gravity are added in addition to the quantity required for neutralizing whereby the lactalbumin is precipitated from the clear solution. The liquid is removed from the precipitated lactalbumin by means of a filtering press and the precipitate is thoroughly washed with water. The washed substance, while still moist is now dissolved in a diluted solution of sodium hydroxid containing exactly 260 gr. of same in 200 kg. water. The resulting neutral solution contains about 10% of the salt and about 90% of water. The mixture is constantly and vigorously stirred while the said hydroxid solution is added. In a short period of time the lactalbumin is dissolved and the solution is of neutral reaction. The solution is now evaporated at a low temperature, preferably in a vacuum at about 50° C. The product thus obtained is reduced to a fine powder. When dissolving same it is essential to note that a large quantity of water at once added to the powder will not give a complete solution and when agitated with the water the mass will again settle at the bottom. If, however, the powder is stirred at first with a very small quantity of water until it swells and gradually more water is added while stirring a durable solution is obtained. One gr. of the sodium-lactalbumin salt requires 50 gr. of water. However other concentrations may be produced and in higher concentrations the solution certainly does not flow so easily. Such solutions are distinguished from solutions of the casein salts by taking up completely the sodium-lactalbumin without leaving an insoluble residue as is the case when casein salts are dissolved.

We claim as our invention:

1. The process of producing a neutral alkali salt of lactalbumin consisting in dissolving dried, fat-free lactalbumin in an excess of an aqueous solution of fixed alkali, precipitating the lactalbumin by means of an acid, separating the precipitate from the liquid, dissolving the precipitate in an aqueous solution containing a chemically equivalent quantity of a fixed alkali, and evaporating the neutral solution at a low temperature whereby a neutral alkali salt of lactalbumin is obtained.

2. The process of producing a neutral alkali salt of lactalbumin consisting in dissolving dried, fat-free lactalbumin in an excess of an aqueous solution of fixed alkali, neutralizing the solution, precipitating the lactalbumin by means of an acid, separating the precipitate from the liquid, washing the precipitate with water, dissolving the precipitate in an aqueous solution containing a chemically equivalent quantity of a fixed alkali, and evaporating the neutral solution *in vacuo* whereby a neutral alkali salt of lactalbumin is obtained.

3. The process of producing a neutral sodium salt of lactalbumin consisting in dissolving dried, fat-free lactalbumin in an excess of an aqueous solution of sodium hydroxid, neutralizing the solution with hydrochloric acid, precipitating then the lactalbumin with hydrochloric acid, separating the precipitate from the liquid, dissolving the precipitate in an aqueous solution containing a chemically equivalent quantity of sodium hydroxid, and evaporating the neutral solution *in vacuo* at a low temperature whereby a neutral sodium salt of lactalbumin is obtained.

4. The process of producing a neutral sodium salt of lactalbumin consisting in mixing 10 parts of dried, fat-free lactalbumin with about 200 parts of water, gradually adding an aqueous solution of sodium hydroxid containing about 0.6 parts of same, neutralizing with hydrochloric acid, precipitating the lactalbumin by hydrochloric acid, separating the precipitate from the liquid, washing the precipitate with water, dissolving while stirring the precipitate in an aqueous solution of sodium hydroxid containing 0.26 parts, and evaporating the neutral solution *in vacuo* at a low temperature whereby a neutral sodium salt of lactalbumin is obtained.

In witness whereof we have hereunto set our (names) hands in presence of two subscribing witnesses.

ERNST FISCHER.
PETER BERGELL.

Witnesses:
HENRY HASPER,
WOLDEMAR HAUPT.